United States Patent
Rogers

(10) Patent No.: US 10,236,803 B2
(45) Date of Patent: Mar. 19, 2019

(54) HYBRID-VEHICLE VARIABLE-VOLTAGE TRACTION MOTOR DRIVE

(71) Applicant: FORD GLOBAL TECHNOLOGIES, LLC, Dearborn, MI (US)

(72) Inventor: Craig B. Rogers, Melvindale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 857 days.

(21) Appl. No.: 14/293,275

(22) Filed: Jun. 2, 2014

(65) Prior Publication Data

US 2015/0349679 A1 Dec. 3, 2015

(51) Int. Cl.
*H02P 6/08* (2016.01)
*B60L 3/00* (2006.01)
(Continued)

(52) U.S. Cl.
CPC .............. *H02P 6/08* (2013.01); *B60L 3/003* (2013.01); *B60L 11/123* (2013.01); *B60L 11/14* (2013.01); *B60L 15/007* (2013.01); *B60L 15/025* (2013.01); *B60L 15/04* (2013.01); *B60L 15/06* (2013.01); *B60L 15/08* (2013.01); *H02P 27/08* (2013.01); *B60L 2210/10* (2013.01); *B60L 2210/40* (2013.01); *B60L 2240/421* (2013.01); *B60L 2240/423* (2013.01); *B60L 2240/427* (2013.01); *B60L 2240/429* (2013.01); *Y02T 10/6217* (2013.01); *Y02T 10/643* (2013.01);
(Continued)

(58) Field of Classification Search
CPC ........................................................ H02P 6/08
USPC ....................................................... 318/400.3
See application file for complete search history.

(56) References Cited

U.S. PATENT DOCUMENTS 7,205,731 B2 4/2007 Nagayama
7,592,766 B2 * 9/2009 Patel .................. B60K 6/26
318/400.02

(Continued)

FOREIGN PATENT DOCUMENTS

WO 2006024968 A1 3/2006

OTHER PUBLICATIONS

Rogers, C.B., Peng, F.Z., "An Increased Efficiency Series Hybrid Electric Bus Using Decoupled DC-link voltages", Transportation Electrification Conference and Expo (ITEC, 2012 IEEE, pp. 1,7, Jun. 18-20, 2012.

(Continued)

*Primary Examiner* — Eduardo Colon Santana
*Assistant Examiner* — Said Bouziane
(74) *Attorney, Agent, or Firm* — David B. Kelley; MacMillan, Sobanski & Todd, LLC

(57) ABSTRACT

A method is provided for controlling a traction motor for an electrified vehicle, wherein the motor is driven by a pulse-width modulated inverter. A drive command from a driver of the vehicle is converted into a demanded torque. A substantially fixed DC link voltage is maintained from a DC power source. An input voltage for supplying to the inverter is calculated that causes the motor to deliver the demanded torque at a transition point between a constant-torque region and a field-weakening region of torque production. The voltage from the DC link is converted to the determined input voltage at an input to the inverter. By lowering the voltage applied to the inverter, switching losses and harmonic losses are reduced.

14 Claims, 5 Drawing Sheets

(51) Int. Cl.
  *B60L 11/12* (2006.01)
  *B60L 11/14* (2006.01)
  *B60L 15/00* (2006.01)
  *B60L 15/02* (2006.01)
  *B60L 15/04* (2006.01)
  *B60L 15/06* (2006.01)
  *B60L 15/08* (2006.01)
  *H02P 27/08* (2006.01)

(52) U.S. Cl.
  CPC ............ *Y02T 10/644* (2013.01); *Y02T 10/645* (2013.01); *Y02T 10/7077* (2013.01); *Y02T 10/7216* (2013.01); *Y02T 10/7241* (2013.01)

(56) References Cited

U.S. PATENT DOCUMENTS

| | | |
|---|---|---|
| 8,274,173 B2 | 9/2012 | King et al. |
| 8,421,271 B2 | 4/2013 | King et al. |
| 8,674,620 B2 | 3/2014 | Capodivacca et al. |
| 8,912,736 B2 | 12/2014 | Kim et al. |
| 9,041,335 B2 * | 5/2015 | Beichter ............ H02M 1/4225 318/432 |
| 2005/0212471 A1 * | 9/2005 | Patel ........................ H02P 21/08 318/432 |
| 2008/0116842 A1 * | 5/2008 | Cheng .................... B60L 15/025 318/807 |
| 2009/0322264 A1 * | 12/2009 | Imura .................... B60L 15/025 318/400.09 |
| 2011/0175558 A1 * | 7/2011 | Kitanaka ................ B60L 15/025 318/400.3 |
| 2012/0038216 A1 * | 2/2012 | Berry .................... B60L 11/005 307/77 |
| 2012/0229086 A1 | 9/2012 | Chi et al. |
| 2013/0002174 A1 * | 1/2013 | Okamura ................ B60L 15/08 318/139 |
| 2013/0069570 A1 | 3/2013 | Chen et al. |
| 2014/0070738 A1 | 3/2014 | Luedtke et al. |
| 2014/0125264 A1 * | 5/2014 | Nakamura ................ H02P 6/10 318/400.23 |

OTHER PUBLICATIONS

Rogers, C.B., "High Efficiency & High Performance Converter/Inverter System Configurations for HEV/EV Traction Drives", Unpublished Dissertation, Michigan State University.

* cited by examiner

HYBRID-VEHICLE VARIABLE-VOLTAGE TRACTION MOTOR DRIVE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electrified vehicles such as hybrid electric vehicles, and, more specifically, to inverter-driven traction motors with reduced losses in the inverter power switching devices.

Electric vehicles, such as hybrid electric vehicles (HEVs), plug-in hybrid electric vehicles (PHEVs), and full electric vehicles, use inverter-driven electric machines to provide traction torque and regenerative braking torque. A typical electric drive system includes a DC power source (such as a battery pack or a fuel cell) coupled by contactor switches to a variable voltage converter (VVC) to regulate a main bus voltage across a main DC linking capacitor. A first DC-to-AC inverter is connected between the main bus and a traction motor to propel the vehicle. The motor can be an induction motor or a permanent magnet motor, for example. A second DC-to-AC inverter is connected between the main bus and a generator to convert mechanical power from an internal combustion engine into electricity as a DC voltage for powering the traction motor (via the first inverter) or for recharging the battery. The second inverter may also be used to regenerate energy during braking to recharge the battery through the VVC.

The inverters each include transistor switches (such as insulated gate bipolar transistors, or IGBTs) connected in a bridge configuration. An electronic controller turns the switches on and off in order to invert a DC voltage from the bus to an AC voltage applied to the motor, or to invert an AC voltage from the generator to a DC voltage on the bus.

The inverter pulse-width modulates the DC link voltage to deliver an approximation of a sinusoidal current output to drive the traction motor with a desired speed and torque. The inverter outputs a series of pulse-width modulated (PWM) square wave voltages as a result of the coordinated switching of the IGBTs. The IGBTs and their reverse-recovery diodes have associated switching losses. In addition, the pulse-width modulation creates harmonic content losses in the motor.

In the circuit topology typically used in hybrid electric vehicle drives, the DC link is common to the generator inverter, battery converter, and traction motor inverter. Consequently, all three share the same substantially-constant DC voltage. The magnitude of the DC link voltage is generally chosen to provide the best operating efficiency for the generator and battery and to be sufficiently high to enable the motor inverter to achieve the upper end of the speed and torque ranges that are specified.

Switching losses in the traction inverter are higher with higher voltages across the inverter. A characteristic of traction motors is that they do not require as high of a voltage magnitude at low angular velocity operating points as they do at higher angular velocity operating points. In order to achieve the lower speed and torque when the DC supply across the inverter is constant, the duty cycle of the pulse-width modulated switching is decreased. Since the higher voltage required for higher speed/torque operating points still appears across the inverter, the same losses are incurred at the lower speed/torque operating points. Thus, during low speed vehicle operation there would be an opportunity to reduce the losses if the DC-link voltage present at the input of the inverter was reduced. Reducing the magnitude of the DC-link voltage present at the input to the inverter would reduce switching losses in the IGBTs, reverse recovery losses in the anti-parallel diodes, and harmonic losses in the traction motor. Reducing the energy losses would improve overall fuel economy.

SUMMARY OF THE INVENTION

In one aspect of the invention, a method is provided for controlling a traction motor for an electrified vehicle, wherein the motor is driven by a pulse-width modulated inverter. A drive command from a driver of the vehicle is converted into a demanded torque. A substantially fixed DC link voltage is maintained from a DC power source (e.g., a battery and/or generator). A controller determines an input voltage for supplying to the inverter that would cause the motor to deliver the demanded torque at a transition point between a constant-torque region and a field-weakening region of torque production. The voltage from the DC link is converted to the determined input voltage at an input to the inverter. By lowering the voltage applied to the inverter, switching losses and harmonic losses are reduced.

DETAILED DESCRIPTION OF PREFERRED EMBODIMENTS

Figure 1:
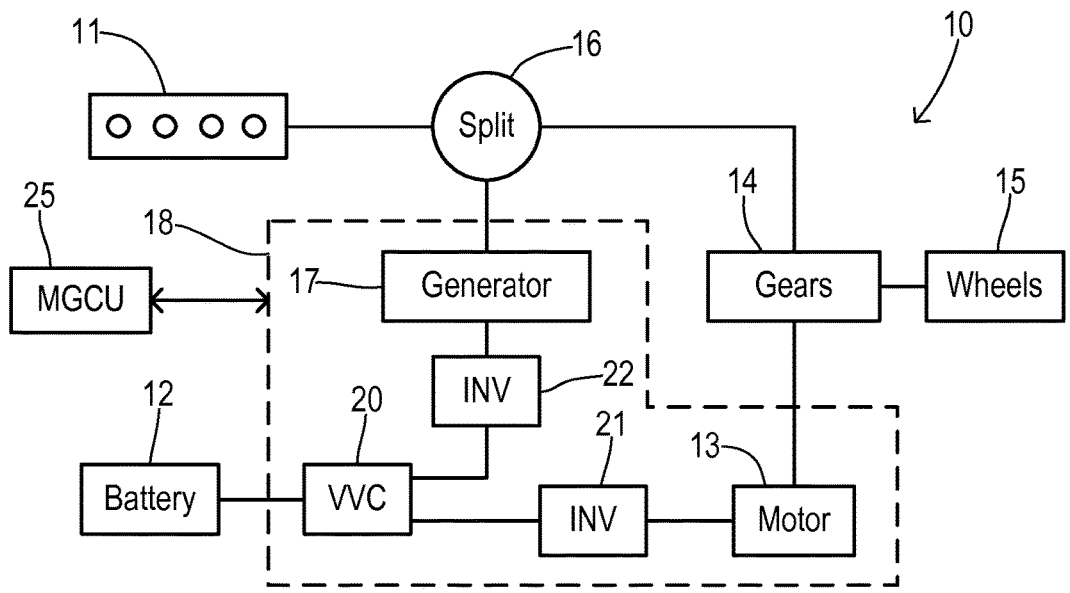
FIG. 1 is a block diagram showing one typical example of a hybrid electric vehicle for incorporating the present invention.

Referring now to FIG. 1, a vehicle 10 is shown as a hybrid electric vehicle with an electric drive system 18. Although a powersplit hybrid layout is shown, the present invention is also applicable to other types of electric vehicle (e.g., HEV, PHEV, or a fully electric vehicle). An internal combustion engine 11 and a battery pack 12 supply energy for propelling vehicle 10. Battery 12 drives a motor 13 with an output coupled to transmission gears 14 for driving vehicle wheels 15. A mechanical output of engine 11 is coupled to gears 14 via a splitting device 16 for providing an engine-driven mode of the powertrain. Splitting device 16 also couples gears 14 to a generator 17 so that engine 11 speed can be controlled independent of the speed of gears 14 and wheels 15, and so that regenerative braking energy can be recovered from the wheels 15 to charge the battery 12 as known in the art.

Electric drive system 18 includes a variable voltage converter 20 for converting the battery voltage to a desired bus voltage. The bus voltage is controllably switched (i.e., commutated) by an inverter 21 to drive motor 13. An inverter 22 is coupled between generator 17 and converter 20 so that AC power from generator 17 during engine speed control is inverted to DC power, which is further converted by converter 20 to an appropriate voltage for recharging battery 12. In order to control the transistor switches of converter 20 and inverters 21 and 22, electric drive system 18 includes a motor-generator control unit (MGCU) 25.

Figure 2:
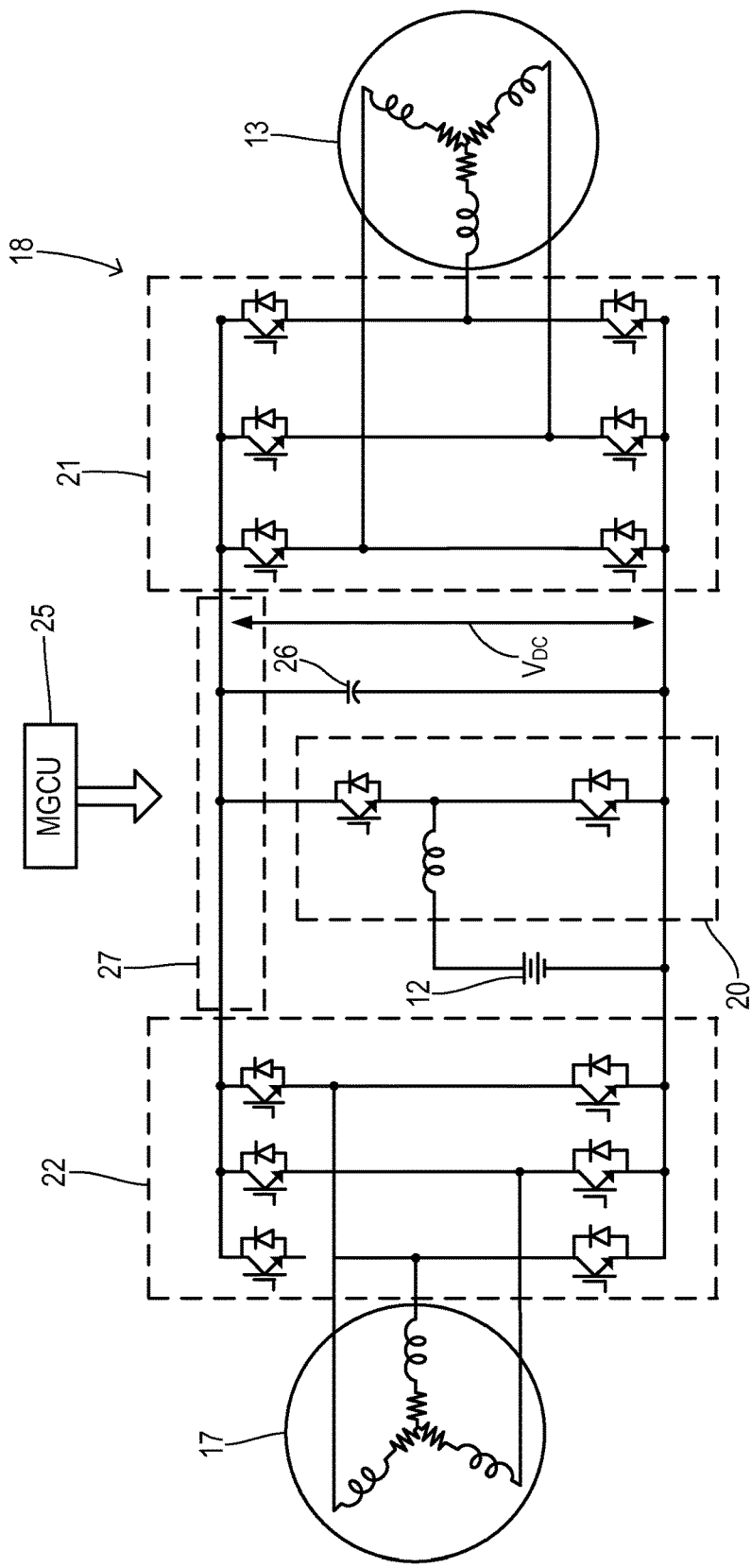
FIG. 2 is a conventional circuit topology with a common DC link voltage shared by the traction inverter and generator inverter.

FIG. 2 shows a conventional back-to-back voltage source inverter to voltage source inverter series hybrid electric or power-split hybrid electric drive technology in greater detail. DC link capacitor 26 provides a constant DC voltage at a bus 27 that is shared by inverters 21 and 22 and by VVC converter 20. MGCU 25 is configured to control the operation of converter 20 and inverters 21 and 22 by coordinated switching of the illustrated transistors using appropriately configured pulse width modulation cycles.

Figure 3:
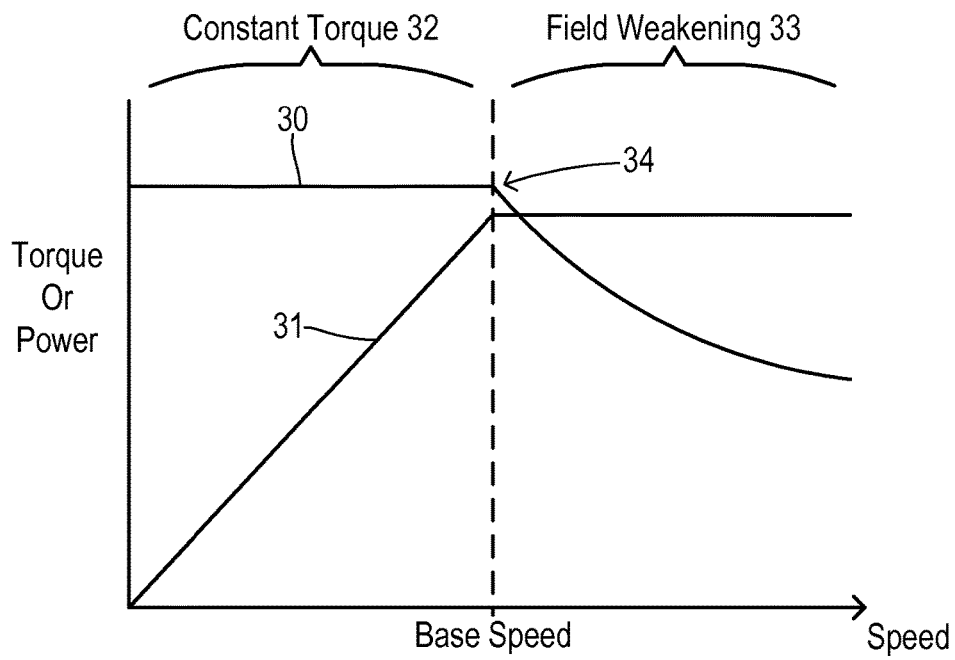
FIG. 3 is graph showing a relationship between motor speed and torque production.

FIG. 3 shows relationships between torque production, power, and base speed for a traction motor. Base speed is a characteristic of the motor determined by its particular construction (i.e., flux linkage, windings, etc.). A plot 30 shows a relationship between torque and base speed, and a plot 31 shows a relationship between power and base speed. Below base speed, a substantially constant torque is produced, while above base speed the torque decreases with increasing speed. In contrast, the power varies with speed at speeds below base speed, while power remains substantially constant at speeds above the base speed. Thus, motor operation is often characterized by a constant torque region 32 below base speed and a field weakening region 33 above base speed.

In the conventional topology with a fixed DC link voltage, base speed is constant. The field weakening region 33 is important for providing a full range of desired speeds. Pulse width modulation occurring in constant torque region 32 also introduces switching losses which are generally higher than the minimum obtainable (except when operating close to the base speed) since DC-link voltages are held higher than needed for this range of speed.

The present invention reduces switching losses by decoupling the main DC link voltage from the traction inverter and instead providing an additional conversion to create a variable DC link voltage exclusively for the traction converter. In particular, the voltage to be input to the traction inverter is varied in a manner wherein the torque production tracks a transition point 34 between constant torque region 32 and field weakening region 33 (i.e., the input voltage is controlled to be a "transition" voltage corresponding to the transition point). In other words, the variable DC link voltage results in a variable base speed, and the effective base speed shifts by an amount that places the operating point of the motor at transition point 34.

Figure 4:
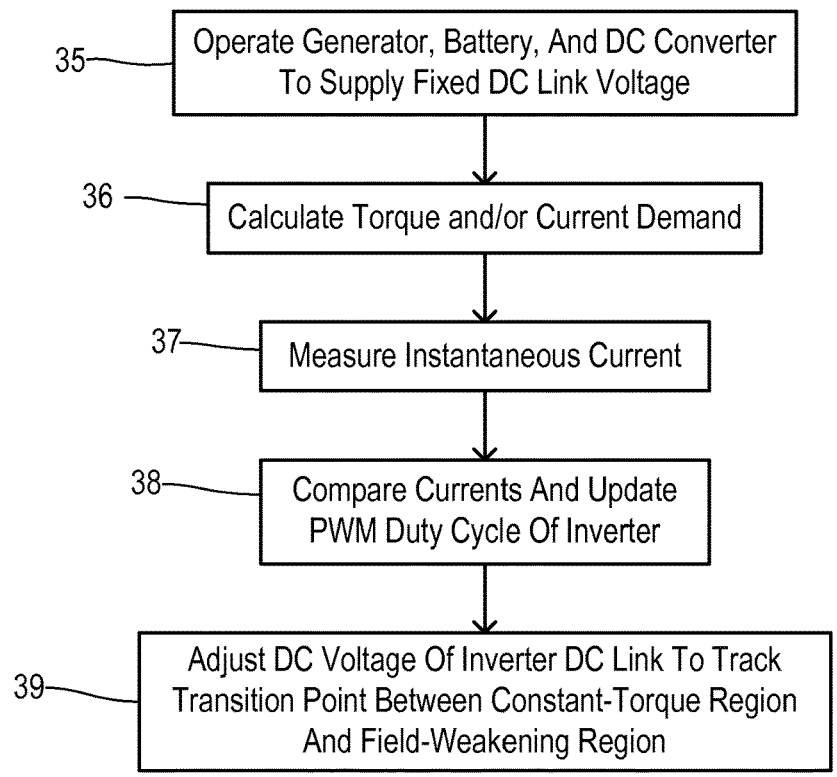
FIG. 4 is flowchart showing one preferred embodiment of a method for providing a variable DC voltage for driving a traction inverter according to the present invention.

FIG. 4 shows a first embodiment of a method of the invention wherein the generator inverter, battery, and main DC converter are operated in a manner that supplies a substantially fixed DC link voltage to a main bus. A torque demand and current demand for the traction motor is calculated in step 36. As known in the art, torque demand may be determined in response to operator input such as operation of an accelerated pedal and/or brake pedal. In step 37, instantaneous current is measured (which is directly proportional to torque). The instantaneous current and current demand are compared in step 38 (which is equivalent to comparing instantaneous torque to demanded torque). Based on the comparison, the PWM duty cycle of the traction inverter is updated in a conventional manner. Additionally, the magnitude of a separate DC voltage being input to the traction inverter from a separate DC link is adjusted in order to track the transition point between the constant torque region and the field weakening region in step 39. Various methods and apparatus can be used in order to appropriately control the inverter DC link voltage as described below.

Figure 5:
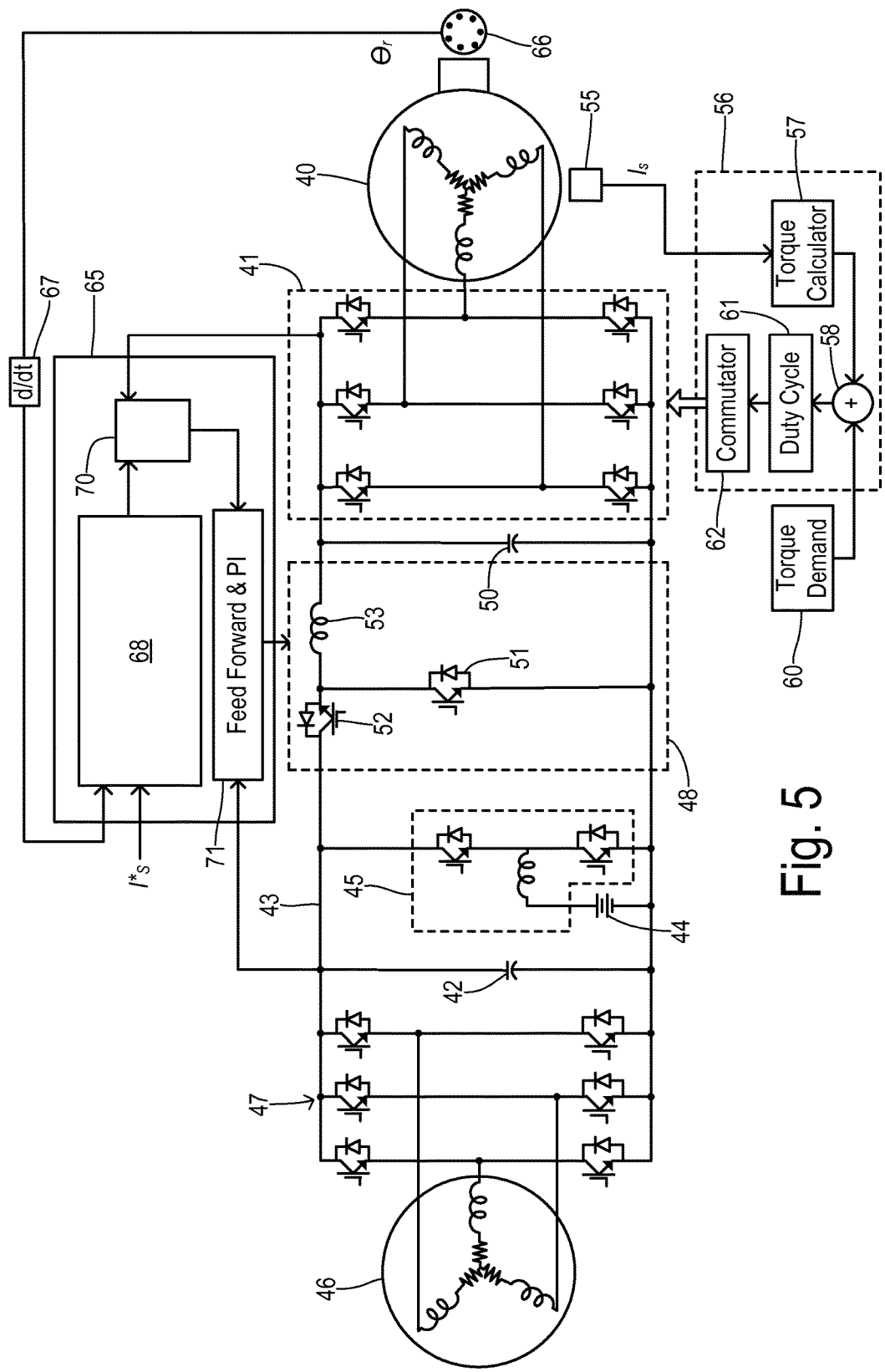
FIG. 5 is a schematic, block diagram showing a drive system according to one preferred embodiment of the invention.

FIG. 5 shows an improved apparatus of the invention wherein a traction motor 40 is driven by a traction inverter 41. A main DC link capacitor 42 is connected to a main DC bus 43. A first DC-to-DC converter 45 is connected to main bus 43 and a storage battery 44. A generator 46 is coupled to the main bus 43 by a generator inverter 47. A second DC-to-DC converter 48 is coupled between main DC bus 43 and a link capacitor 50 in order to supply a variable input voltage to traction inverter 41. Converter 48 includes IGBT transistor switches 51 and 52 and an inductor 53 connected in a buck configuration. Pulse width modulated switching of transistors 51 and 52 is performed using a duty cycle that results in a desired DC voltage across link capacitor 50 for input to inverter 41.

PWM switching of traction inverter 41 is performed in a conventional manner by a motor controller 56 based on a measured stator current from a sensor 55. Measured stator current $I_s$ may be used by a torque calculator 57 to calculate an instantaneous motor torque, the value of which is coupled to one input of a summer 58. A desired torque is obtained from torque demand unit 60, which may include a driver input device, such as an accelerator pedal, and an engine control unit. Thus, a particular acceleration or deceleration indicated by the driver's action is used to determine how much torque should be delivered to the vehicle wheels. The calculated torque demand is coupled to another input of summer 58, and any difference between calculated instantaneous torque and the torque command is used in a duty cycle block 61 to update the duty cycle and/or operating frequency being used for switching inverter 41. A commutator 62 drives the inverter switches using the calculated duty cycle as known in the art.

An instantaneous motor speed is obtained using a motor position sensor 66 and velocity determination circuit 67. A resulting calculated motor speed ω is input to a controller 65. A calculation unit 68 in controller 65 receives the motor speed and a target motor current $I^*_s$. The target current may be obtained from motor controller 56, for example. Controller 65 uses the demanded torque (expressed as a current) in order to calculate a minimum value for the variable inverter-input voltage which would allow inverter 41 and motor 40 to generate the desired torque without entering the flux weakening region. More specifically, unit 68 calculates a DC voltage that causes the torque production to track the transition point between the constant torque region and the field weakening region. The calculation may preferably implement the following formula:

$$V_{dc} \approx \frac{\sqrt{\left(\left(R_s + L_q \frac{d}{dt}\right)I_s + \omega_r \lambda_{af}\right)^2 + (\omega_r L_q I_s)^2}}{0.45\sqrt{2}}$$

wherein $R_s$ is resistance of the stator windings, $L_q$ is the quadrature-axis inductance, $\lambda_{af}$ is armature flux linkage due to rotor magnets, and $I_s$ is stator current as derived from the desired torque equation. The formula captures the various elements that contribute to the voltage requirements for the motor to achieve the desired stator current, and thus the desired torque. The most significant element is the flux linkage of the rotor magnets with the stator windings and the motor speed, as represented by $\omega_r \lambda_{af}$. Thus, with more stator windings, stronger rotor magnets, or higher speed, then the higher the voltage needs to be. The motor inductance interacts with changing current, resulting in the contribution shown as $dI_s/dt^L_q$. The inductance also reacts with stator current and rotor speed ($\omega_r L_q I_s$). Another voltage component comes from stator resistance and stator current ($R_s I_s$). The resulting voltage $V_{dc}$ is the minimum voltage requirement to obtain the desired torque. A higher voltage would lead to a reduction in the PWM duty cycle in order to avoid producing too much torque.

In order to adjust the voltage from second DC-to-DC converter 48 (i.e., the input voltage for the traction inverter) to match the calculated minimum value, a comparator 70 compares the actual voltage across inverter 41 with the desired value as obtained from calculation unit 68. Comparator 70 provides the difference as an error signal to a feedforward/proportional-integral controller 71. The feedforward portion of controller 71 receives the main DC link voltage from the bus 43. Controller 71 uses known techniques to update a duty cycle for the switching of transistors 51 and 52 in order to adjust the DC voltage across link capacitor 50 to track calculated minimum $V_{dc}$ from calculation unit 68.

Figure 6:
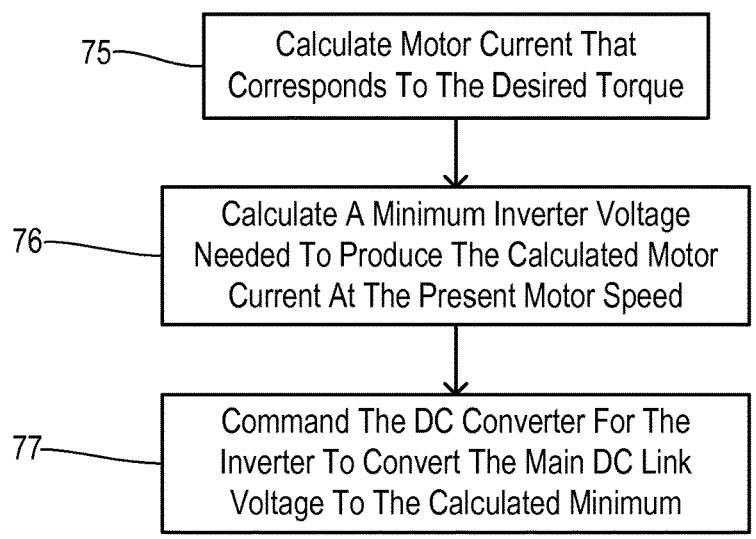
FIG. 6 is a flowchart showing one embodiment of a method for controlling an inverter input voltage in greater detail.

The corresponding method is shown in FIG. 6. A motor current corresponding to the desired torque is calculated in step 75. A minimum inverter voltage needed to produce the calculated motor current at the present motor speed is calculated in step 76. In step 77, the DC converter for the inverter is commanded to convert the main DC link voltage to the calculated minimum voltage.

Figure 7:
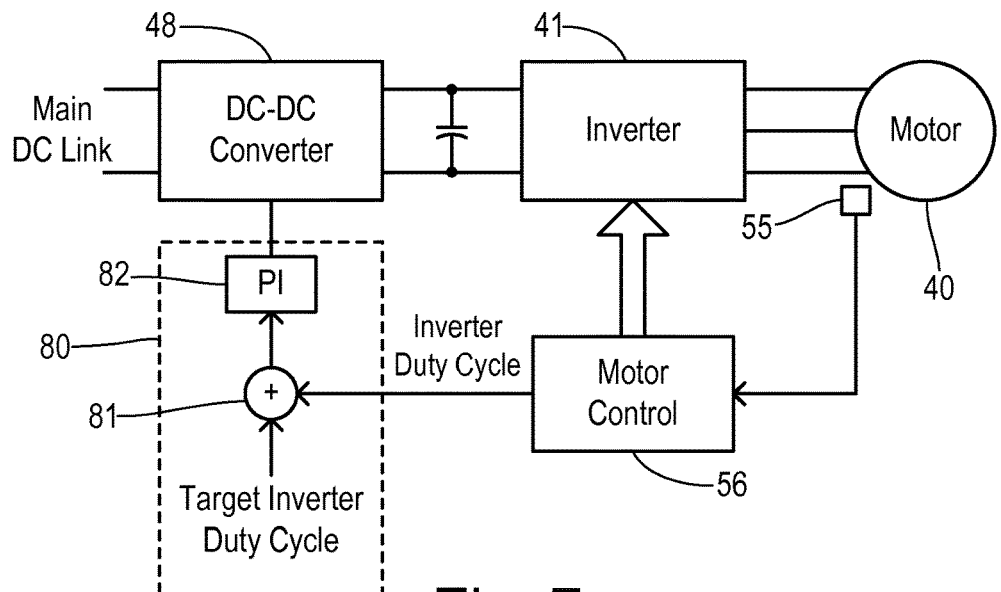
FIG. 7 is a block diagram showing an alternative drive system.

FIG. 7 shows an alternative embodiment wherein instead of using the motor's stator current as a control variable, the PWM duty cycle generated within motor control 56 is used as a control variable. Thus, a controller 80 receives the instantaneous PWM duty cycle from motor control 56 at one input of a summer 81. A target duty cycle is provided to a second input of summer 81. The target duty cycle corresponds to a maximum duty cycle of substantially 100%. One of the summer inputs is inverting. Any difference between the duty cycles is applied to a proportional-integral controller 82 which accordingly increases or decreases the DC voltage that is output from converter 48 in a manner that maintains the PWM duty cycle for inverter 51 at its maximum value.

Figure 8:
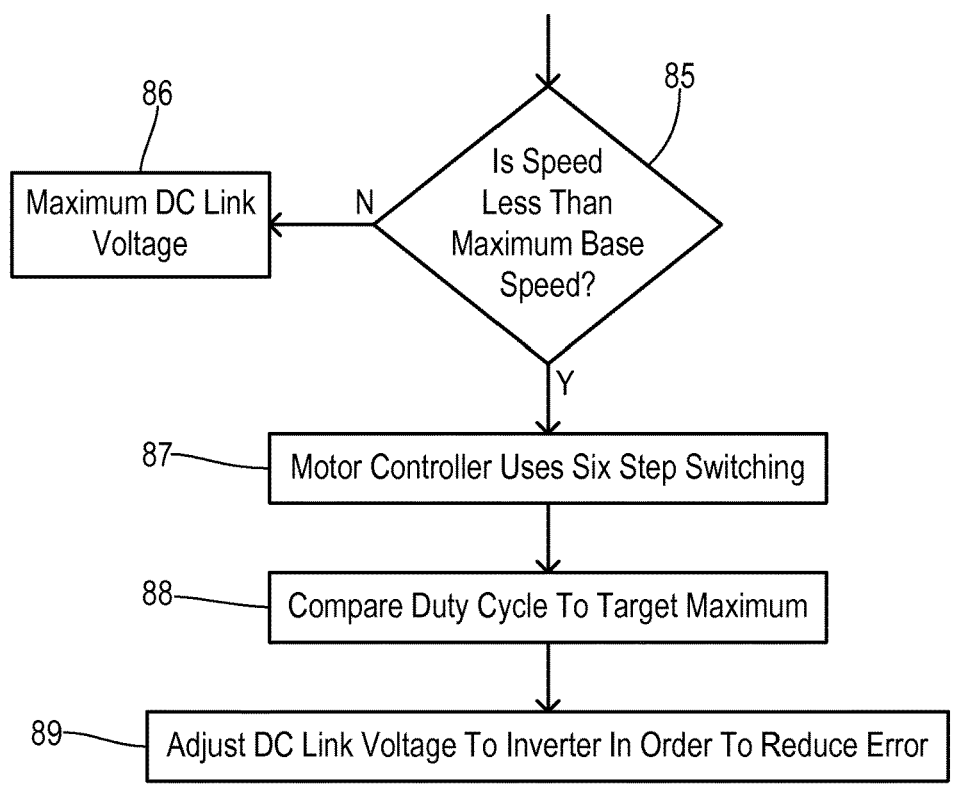
FIG. 8 is a flowchart showing a method associated with the drive system of FIG. 7 for controlling an inverter input voltage.

A corresponding method is shown in FIG. 8 wherein the instantaneous motor speed is checked against a maximum base speed in step 85. The maximum base speed may be set during system development when a particular optimal motor design is selected. Thus, for higher-speed operating points, it may be desirable to continue to employ operation in the field weakening region, which means that the input voltage for the traction inverter will sometimes need to rise to the level of the main DC link voltage. In that circumstance, it becomes impossible to reduce switching losses by reducing the traction inverter input voltage. Therefore, a maximum DC link voltage is employed in step 86. On the other hand, if speed is less than the minimum base speed then switching losses can be reduced by lowering the traction inverter input voltage. Moreover, the motor controller can implement six step switching in step 87 since the field weakening region is avoided. In step 88, the current duty cycle of the inverter is compared to the target maximum. In step 89, the DC link voltage for the inverter is adjusted in order to reduce the error. Since reducing the error restores the duty cycle to the target maximum, the allowed movement of base speed and achievement of inverter max duty cycle allow increased opportunities to use reduced switching frequency methods such as six step which result in fewer switching events occurring. The opportunities to reduce the number of switching events, reduce switching frequency, and reduce DC voltage levels all result in the significant reduction of switching losses by the present invention.

What is claimed is:

1. A method of controlling a traction motor for an electrified vehicle, comprising the steps of:
    boosting a battery voltage to a fixed DC voltage with a boost converter;
    reducing the fixed DC voltage to a variable link voltage with a buck converter;
    driving an inverter receiving the variable link voltage with a variable duty cycle regulated to generate a desired torque from the motor; and
    adjusting the variable link voltage to regulate the duty cycle so that torque production tracks a transition point between a constant-torque region and a field-weakening region.

2. The method of claim 1 wherein the vehicle includes a driver demand control, the method further comprising the steps of:
    monitoring the driver demand control to determine the desired torque;
    calculating a current flow in the motor that produces the desired torque; and
    calculating the variable link voltage as a minimum voltage that produces the calculated current.

3. The method of claim 2 wherein the minimum voltage is calculated in response to the calculated current and a rotational speed of the motor.

4. The method of claim 1 wherein the step of adjusting the variable link voltage is comprised of:
    comparing the variable duty cycle to a target duty cycle; and
    adjusting the variable link voltage to reduce an error between the variable duty cycle and the target duty cycle.

5. A hybrid electric vehicle comprising:
    a generator;
    a traction motor;
    a DC power source;
    a DC link capacitor;
    a first inverter coupled between the generator and the DC link capacitor;
    a first DC-to-DC converter coupled between the DC power source and the DC link capacitor, wherein a substantially constant DC link voltage is provided across the DC link capacitor;

a second DC-to-DC converter having an input coupled to the DC link capacitor for generating a variable DC voltage;
a second inverter coupled between the second DC-to-DC converter and the traction motor, wherein the second inverter is switched with a pulse-width modulated (PWM) duty cycle that generates a target motor current corresponding to a desired motor torque; and
a DC-DC controller adjusting the second DC-to-DC converter to generate the variable voltage at substantially a minimum value that allows the second inverter to generate the target motor current without field weakening in the motor.

6. The vehicle of claim 5 wherein the DC-DC controller comprises a proportional-integral controller comparing the variable voltage to the minimum value and reducing any error detected by the comparison by modifying a pulse-width modulated duty cycle of the second DC-to-DC converter.

7. The vehicle of claim 5 wherein the minimum value is determined by the DC-DC controller in response to a calculated current flow in the motor that produces the desired torque at a rotational speed of the motor.

8. The vehicle of claim 7 wherein the minimum value equals:

$$\frac{\sqrt{\left(\left(R_s + L_q \frac{d}{dt}\right)I_s + \omega_r \lambda_{af}\right)^2 + (\omega_r L_q I_s)^2}}{0.45\sqrt{2}}$$

wherein $R_s$ is a stator resistance, $L_q$ is a quadrature-axis inductance, $I_s$ is the calculated current corresponding to the desired torque, $\omega_r$ is the rotational speed, and $\lambda_{af}$ is an armature flux linkage.

9. The vehicle of claim 5 wherein the minimum value is determined by the DC-DC controller by comparing the variable duty cycle to a target duty cycle, and adjusting the minimum value to reduce an error between the variable duty cycle and the target duty cycle.

10. The vehicle of claim 5 wherein the DC power source is comprised of a battery and a generator driven by an internal combustion engine.

11. The vehicle of claim 5 wherein the second DC-to-DC converter is comprised of a buck converter.

12. A hybrid electric vehicle comprising:
a traction motor;
an inverter driving the motor with a variable duty cycle to generate a target current producing a desired torque;
a DC link receiving a DC voltage from a boost converter; and
a DC buck converter converting the DC voltage to a variable DC voltage used by the inverter, the variable DC voltage having a minimum value that generates the target current without field weakening in the motor.

13. The vehicle of claim 12 wherein the inverter is switched with a pulse-width modulated (PWM) duty cycle that generates the target motor current corresponding to the desired torque, and wherein the vehicle further comprises:
a controller adjusting the DC converter to generate the variable DC voltage at the minimum value that allows the inverter to generate the target motor current.

14. The vehicle of claim 13 wherein the controller comprises a proportional-integral controller comparing the variable DC voltage to the minimum value and reducing any error detected by the comparison by modifying a pulse-width modulated duty cycle of the DC converter.

* * * * *